United States Patent
Kim et al.

(10) Patent No.: US 11,031,181 B2
(45) Date of Patent: Jun. 8, 2021

(54) DIELECTRIC COMPOSITION AND MULTILAYER CAPACITOR COMPRISING THE SAME

(71) Applicant: SAMSUNG ELECTRO-MECHANICS CO., LTD., Suwon-si (KR)

(72) Inventors: Kyung Sik Kim, Suwon-si (KR); Ji Hong Jo, Suwon-si (KR); Kyoung Jin Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 3 days.

(21) Appl. No.: 16/402,488

(22) Filed: May 3, 2019

(65) Prior Publication Data

US 2020/0265996 A1  Aug. 20, 2020

(30) Foreign Application Priority Data

Feb. 15, 2019 (KR) .................. 10-2019-0018061

(51) Int. Cl.
*H01G 4/12* (2006.01)
*H01G 4/33* (2006.01)
*C04B 35/468* (2006.01)
*H01G 4/012* (2006.01)
*H01G 4/30* (2006.01)

(52) U.S. Cl.
CPC .......... *H01G 4/1227* (2013.01); *H01G 4/012* (2013.01); *H01G 4/30* (2013.01)

(58) Field of Classification Search
CPC .................. H01G 4/1227; C04B 35/4682
See application file for complete search history.

(56) References Cited

U.S. PATENT DOCUMENTS

| 8,154,851 | B2 * | 4/2012 | Fukuda ............. C04B 35/62815 361/321.4 |
| 2002/0016249 | A1 * | 2/2002 | Saito .................... H01G 4/1227 501/139 |
| 2009/0310279 | A1 | 12/2009 | Sasabayashi et al. |
| 2014/0092525 | A1 * | 4/2014 | Kang .................. H01G 4/1236 361/305 |

(Continued)

FOREIGN PATENT DOCUMENTS

| JP | 4805938 B2 | 8/2011 |
| JP | 2013065592 A * | 4/2013 |

(Continued)

OTHER PUBLICATIONS

Office Action issued in corresponding Korean Patent Application No. 10-2019-0018061 dated May 12, 2020, with English translation.

(Continued)

*Primary Examiner* — Karl E Group
(74) *Attorney, Agent, or Firm* — Morgan, Lewis & Bockius LLP

(57) ABSTRACT

A dielectric composition includes a base material powder including barium titanate ($BaTiO_3$), and zirconium (Zr) within a range from greater than 0.5 moles to 1.5 moles, with respect to 100 moles of the base material powder. In addition, a multilayer capacitor includes the dielectric composition.

13 Claims, 5 Drawing Sheets

(56) References Cited

U.S. PATENT DOCUMENTS

2016/0086735 A1    3/2016  Yoon et al.
2016/0307701 A1   10/2016  Park et al.
2018/0265413 A1*   9/2018  Okamoto ................. H01G 4/12

FOREIGN PATENT DOCUMENTS

KR    10-2009-0105972 A     10/2009
KR    10-2016-0034763 A      3/2016
KR    10-2016-0123645 A     10/2016
WO    WO-2017094882 A1 *    6/2017  .............. H01G 4/12

OTHER PUBLICATIONS

Yan Wang and Kangkang Miao, "Improved temperature stability of dielectric properties for $BaZr0.134Ti0.866O3$ ceramics by hydro-phase method at atmospheric pressure", Ferroelectrics, 2017, vol. 514, pp. 19-24.

* cited by examiner

DIELECTRIC COMPOSITION AND MULTILAYER CAPACITOR COMPRISING THE SAME

CROSS-REFERENCE TO RELATED APPLICATIONS

This application claims the benefit of priority to Korean Patent Application No. 10-2019-0018061 filed on Feb. 15, 2019 in the Korean Intellectual Property Office, the entire disclosure of which is incorporated herein by reference.

BACKGROUND

1. Field

The present disclosure relates to a dielectric composition and a multilayer capacitor comprising the same.

2. Description of Related Art

A multilayer capacitor is an electronic component using dielectric material, and may have various sizes and forms depending on the intended use and the capacitance thereof. In line with recent trends in electronic products, there has been increasing demand for multilayer capacitors to be miniaturized and to have a higher density of integration.

To achieve miniaturization and a higher density of integration of a multilayer capacitor, it is necessary to reduce the thickness of dielectric layers and internal electrodes constituting the multilayer capacitor.

However, the smaller the thickness of dielectric layers and internal electrodes, the greater the strength of an electrical field applied to the dielectric layers under a same voltage condition. Thus, DC-bias characteristics of a multilayer capacitor may deteriorate with decreasing thickness of dielectric layers and internal electrodes therein.

Furthermore, the dielectric constant of a dielectric material used in multilayer capacitors typically undergoes significant changes in response to changes in temperature, and therefore, a loss of capacitance of a multilayer capacitor may occur particularly at high temperature.

SUMMARY

According to an aspect of the present disclosure, a dielectric composition includes a base material powder containing barium titanate ($BaTiO_3$) and zirconium (Zr) in a range from greater than 0.5 moles to 1.5 moles or less with respect to 100 moles of the base material powder.

According to an example embodiment, the dielectric composition may further include 0.3-2.0 moles of gadolinium (Gd) with respect to 100 moles of the base material powder.

In an example embodiment, the dielectric composition may further include an aluminum (Al) oxide.

In an example embodiment, the dielectric composition may further include a magnesium (Mg) oxide or carbonate.

In an example embodiment, the dielectric composition may further include an aluminum (Al) oxide and a magnesium (Mg) oxide or carbonate.

According to another aspect of the present disclosure, a multilayer capacitor includes a body including dielectric layers having an average thickness of 0.4 μm or less, and internal electrodes each having an average thickness of 0.4 μm or less. An external electrode is disposed on the body and in contact with the internal electrodes. The dielectric layers include dielectric grains including a base material powder containing barium titanate ($BaTiO_3$) and shell portions including an additive employed therein and grain boundaries present among the dielectric grains, and the shell portions of the dielectric layers contain zirconium (Zr) in a range from greater than 0.5 moles to 1.5 moles or less with respect to 100 moles of the base material powder.

In an example embodiment, the multilayer capacitor may further include 0.3-2.0 moles of gadolinium (Gd) with respect to 100 moles of the base material powder in the shell portions of the dielectric layers.

In an example embodiment, the multilayer capacitor may further include an aluminum (Al) oxide in the dielectric grains of the dielectric layers.

In an example embodiment, the multilayer capacitor may further include a magnesium (Mg) oxide or carbonate in the dielectric grains of the dielectric layers.

In an example embodiment, the multilayer capacitor may further include an aluminum (Al) oxide and a magnesium (Mg) oxide or carbonate in the dielectric grains of the dielectric layers.

In an example embodiment, the multilayer capacitor may have a length of 1.0 mm or less and a width of 0.5 mm or less.

According to another aspect of the present disclosure, a multilayer capacitor includes a body having a plurality of first internal electrodes and a plurality of second internal electrodes that are alternately stacked with dielectric layers therebetween, and first and second external electrodes connected to the plurality of first internal electrodes and to the plurality of second internal electrodes, respectively. The dielectric layers include a perovskite material having A ions larger than B ions, in which a plurality of B ion sites are occupied by ions having a same valence as the B ions and a different radius therefrom.

The dielectric layers may include barium titanate BT ($BaTiO_3$) as the perovskite material in which $Ti^{4+}$ ion sites are occupied by ions having a same valence as the B ions and a different radius therefrom.

The dielectric layers may include barium titanate BT ($BaTiO_3$) as the perovskite material in which $Ti^{4+}$ ion sites are occupied by $Zr^{4+}$ ions.

The ions having the same valence as the B ions and occupying sites of the B ions of the perovskite material may have a larger radius than the B ions of the perovskite material.

The ions having the same valence as the B ions and occupying sites of the B ions in the perovskite material may be contained within a range from greater than 0.5 moles to 1.5 moles or less, with respect to 100 moles of a material of the dielectric layers.

The dielectric layers may further include gadolinium (Gd) within a range from 0.3 moles to 2.0 moles, with respect to 100 moles of a material of the dielectric layers.

The dielectric layers may further include an aluminum (Al) oxide.

The dielectric layers may further include a magnesium (Mg) oxide or carbonate.

The dielectric layers may further include an aluminum (Al) oxide, and a magnesium (Mg) oxide or carbonate

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
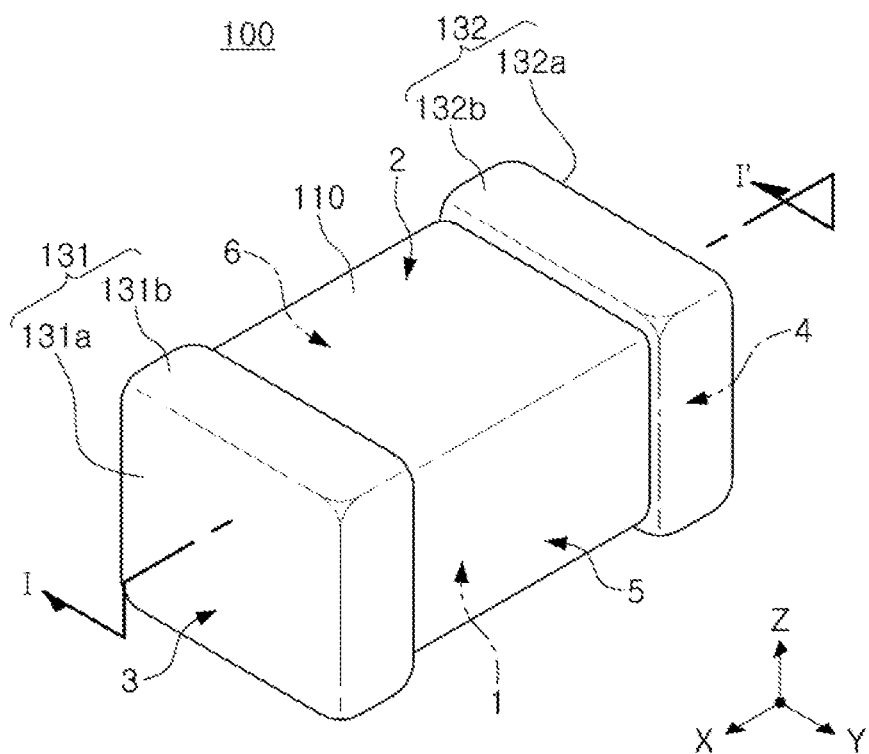
FIG. 1 is a perspective view of a multilayer capacitor according to an example embodiment of the present disclosure.

Hereinbelow, example embodiments of the present disclosure will be described in detail with reference to accompanying drawings.

However, various changes in form and details may be made within these example embodiments without departing from the scope of the present disclosure.

Furthermore, these example embodiments are provided to assist a person having ordinary skill in the art in gaining a comprehensive understanding of the present disclosure.

Accordingly, the relative size, proportions, and depiction of elements in the drawings may be exaggerated for clarity, and throughout the drawings and the detailed description, like reference numerals refer to like elements.

Furthermore, like reference numerals refer to like elements with similar functions and effects throughout the various drawings.

Furthermore, throughout the specification, the terms "comprises," "includes," "has," and any other variations thereof are used in their non-limiting sense to mean that items following the terms are included, but items not specifically mentioned are not excluded.

The present disclosure relates to a dielectric composition, and a multilayer capacitor comprising the dielectric composition according to example embodiments.

Hereinbelow, the directions of a multilayer capacitor may be defined for the purpose of describing the example embodiments with increased clarity, such that X, Y, and Z in the drawings are defined as a length direction, a width direction, and a thickness direction of a body 110, respectively.

Also, in example embodiments, a Z direction may be regarded as a stacking direction in which dielectric layers 111 are stacked.

Figure 2:
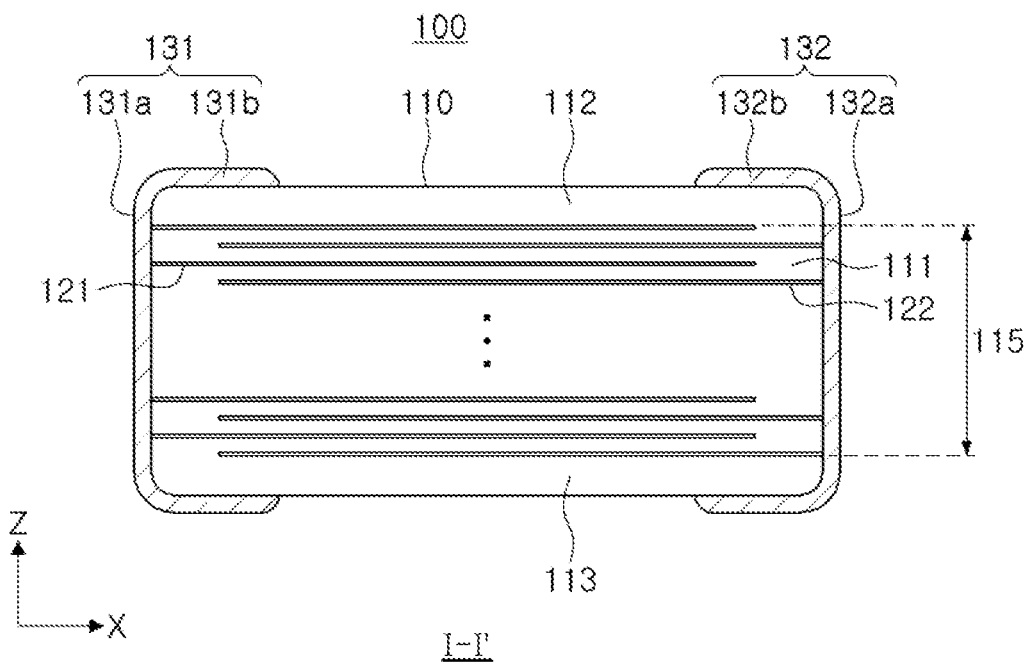
FIG. 2 is a cross-sectional view taken along line I-I' of FIG. 1.
Figure 3:
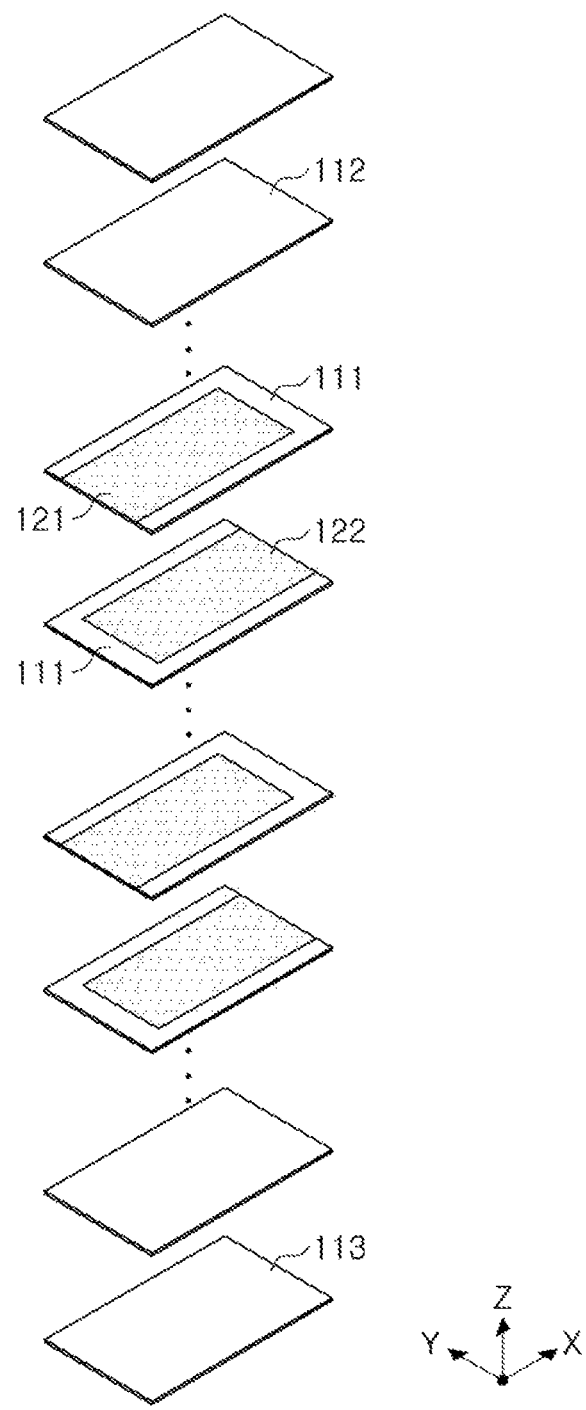
FIG. 3 is an exploded perspective view illustrating dielectric layers and internal electrodes of a body according to an example embodiment of the present disclosure.

FIG. 1 is a schematic perspective view of a multilayer capacitor according to an example embodiment, FIG. 2 is a cross-sectional view taken along line I-I' of FIG. 1, and FIG. 3 is an exploded perspective view illustrating structures of dielectric layers and internal electrodes in a body of a multilayer capacitor according to an example embodiment.

Referring to FIG. 1 through FIG. 3, a multilayer capacitor 100 includes a body 110 including a plurality of dielectric layers 111 and first and second internal electrodes 121 and 122, and first and second external electrodes 131 and 132.

The multilayer capacitor 100 may have a length of 1.0 mm or less in an X direction and a width of 0.5 mm or less in a Y direction.

The body 110 may be formed by stacking the plurality of dielectric layers 111 in the Z direction and sintering the stacked dielectric layer 111, wherein the dielectric layers 111 inside the body 110 are integrated with one another such that it may be difficult to identify boundaries between adjacent dielectric layers without using a scanning electron microscope (SEM).

The body 110 is not limited to any particular shape, but may be substantially hexahedron in shape, without being limited thereto.

Further, the shape and dimensions of the body 110, and the number of stacked dielectric layers 111 are not limited to those illustrated in the drawings.

For convenience of explanation, two surfaces facing each other in the Z direction of the body 110 are defined as first and second surfaces 1 and 2, two surfaces connected to the first and second surfaces 1 and 2 and facing each other in the X direction are defined as third and fourth surfaces 3 and 4, and two surfaces connected to the first and second surfaces 1 and 2, connected to the third and fourth surfaces 3 and 4, and facing each other in the Y direction are defined as fifth and sixth surfaces 5 and 6.

In the present example embodiment, amounting surface of the multilayer capacitor 100 may be the first surface 1 of the body 110.

In addition, the dielectric layers 111 contained in the body 110 may be produced to contain a dielectric composition.

Figure 7:
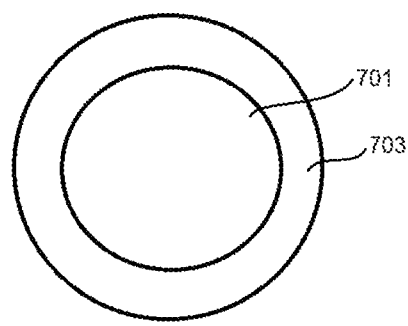
FIG. 7 is a schematic diagram showing a dielectric grain having a shell portion.

Here, the dielectric composition includes dielectric grains containing barium titanate ($BaTiO_3$) and shell portions including an additive employed therein and grain boundaries present among the dielectric grains, wherein the shell portions of the dielectric layers include zirconium (Zr) in a range from greater than 0.5 moles to 1.5 moles or less with respect to 100 moles of a base material powder. For example, as illustratively shown in FIG. 7, a dielectric grain 701 may have a shell portion 703 disposed on a surface of the dielectric grain. While the dielectric grain 701 is illustratively shown as being circular/spherical and the shell portion 703 is illustratively shown as having an even thickness on the outer surface of the dielectric gain 701 in FIG. 7, the dielectric grain 701 may more generally have a different shape such as an irregular shape and the shell portion 703 may have a variable or uneven thickness or disposition on the dielectric gain 701.

In addition, the body 110 may include an active region 115 serving as a portion contributing to forming capacitance of a capacitor, and upper and lower cover portions 112 and 113 disposed in upper and lower portions of the active region 115 in the Z direction, respectively, and serving as upper and lower margin portions, respectively.

The upper and lower cover portions 112 and 113 may have the same material and configurations as the dielectric layers 111 of the active region 115, except not including internal electrodes.

Here, the upper and lower cover portions 112 and 113 may be formed by stacking a single dielectric layer, or two or more dielectric layers, on upper and lower surfaces of the active region 115 in the Z direction, respectively.

The upper and lower cover portions 112 and 113 may play a role in protecting first and second internal electrodes 121 and 122, primarily from physical or chemical stress.

The first and second internal electrodes 121 and 122 may have different polarities from each other and may be alternately disposed along the Z direction with the dielectric layers 111 interposed therebetween, and one end of each of the first and second internal electrodes 121 and 122 may be exposed through the third and fourth surfaces 3 and 4 of the body 110, respectively.

Here, the first and second internal electrodes 121 and 122 may be electrically insulated from each other by the dielectric layers 111 interposed therebetween.

End portions of the first and second internal electrodes 121 and 122, respectively exposed through the third and fourth surfaces 3 and 4 of the body 110, may be in contact with and thereby electrically connected to the first and second external electrodes 131 and 132 disposed on the third and fourth surfaces 3 and 4 of the body 110, respectively.

Through the aforementioned configuration, when a predetermined voltage is applied between the first and second external electrodes 131 and 132, charges are accumulated between the first and second internal electrodes 121 and 122.

Here, a capacitance of the multilayer capacitor 100 is proportional to an overlapping area formed by the first and second internal electrodes 121 and 122 overlapping each other in the Z direction in the active region 115.

The first and second external electrodes 131 and 132 may be supplied with voltages having different polarities from each other, and may respectively be disposed on both end portions of the body 110 in the X direction. In addition, the first and second external electrodes 131 and 132 may be disposed to be in contact with end portions of the first and second internal electrodes 121 and 122, respectively, which are alternately exposed through the third and fourth surfaces of the body 110, respectively, and thus may be electrically connected to the first and second internal electrodes 121 and 122, respectively, thereby forming a capacitor circuit.

The first external electrode 131 may include a first head portion 131a and a first band portion 131b.

The first head portion 131a is a portion of the first external electrode 131 that is formed on the third surface 3 of the body 110 and disposed in contact with exposed portions of the first internal electrode(s) 121, and the first band portion 131b is a portion of the first external electrode 131 that extends from the first head portion 131a onto a portion of a mounting surface of the body 110 (e.g., the first surface 1).

Here, the first band portion 131b may be extended further onto portions of the fifth and sixth surfaces 5 and 6 and a portion of the second surface 2 of the body 110, to increase adhesive strength and the like.

The second external electrode 132 may include a second head portion 132a and a second band portion 132b.

The second head portion 132a is a portion of the second external electrode 132 that is formed on the fourth surface 4 of the body 110 and disposed in contact with exposed portions of the second internal electrode(s) 122, and the second band portion 132b is a portion of the second external electrode 132 that extends from the second head portion 132a onto a portion of the mounting surface of the body 110 (e.g., the first surface 1).

Here, the second band portion 132b may be extended further onto portions of the fifth and sixth surfaces 5 and 6 and a portion of the second surface of the body 110 of a capacitor, to increase adhesive strength and the like.

In addition, the first and second external electrodes 131 and 132 may further include, if necessary, a conductive layer formed on (e.g., formed directly on) the third and fourth surfaces 3 and 4 of the body 110, and a plated layer formed on the conductive layer.

Here, the plating layer may include a Ni-plated layer formed on the conductive layer, and a Sn-plated layer formed on the Ni-plated layer.

Further, in the present example embodiment, the dielectric layers 111 included in the body 110 may contain a reduction-resistant dielectric composition, wherein the dielectric composition may further contain various oxide and carbonate additives.

Hereinbelow, each component of the dielectric composition according to an example embodiment of the present disclosure will be described in greater detail.

The base material powder of the dielectric composition according to the present example embodiment includes barium titanate BT ($BaTiO_3$) as the main ingredient of a dielectric material.

In addition, the dielectric composition of the present example embodiment may include zirconium (Zr) in an amount greater than 0.5 moles to 1.5 moles with respect to 100 moles of the base material powder.

Here, when the content of zirconium (Zr) is 0.5 moles or less, as described above, the effect of improving the temperature change coefficient (TCC) of a multilayer capacitor may be negligible.

Also, when the content of zirconium (Zr) is greater than 1.5 moles, densification of the dielectric body may be decreased, thus causing various adverse effects on the multilayer capacitor.

Also, the dielectric composition of the present example embodiment may further include gadolinium (Gd). In particular, gadolinium (Gd), as a rare earth element, may be contained in oxide or carbonate form, wherein the oxide or carbonate form is not limited to any particular form.

Gadolinium (Gd) may play a role in controlling the grain growth of dielectric grains and making the distribution of grains uniform, and may be employed in the crystal lattice of BT and serve as a donor, thereby improving reliability of the multilayer capacitor.

Here, the dielectric composition may include 0.3-2.0 moles of gadolinium (Gd) with respect to 100 moles of the base material powder.

When the content of gadolinium (Gd) is less than 0.3 moles, improvement in reliability may be negligible, whereas the content of gadolinium (Gd) greater than 2.0 moles may undesirably degrade density and TCC.

Also, the dielectric composition of the present example embodiment may further include either one or both of aluminum (Al) and magnesium (Mg).

In the present example embodiment, aluminum (Al) and magnesium (Mg) may play a role in controlling a uniform grain growth of dielectric grains.

When the grain growth of dielectric grains is controlled to be uniform, DC-bias characteristics of the multilayer capacitor, as well as withstand voltage and reliability thereof, may be improved.

Typically, a conventional dielectric composition used in multilayer capacitors is produced by employing calcium (Ca), manganese (Mn), magnesium (Mg), rare-earth elements, and the like, in the main ingredient of the dielectric composition, barium titanate ($BaTiO_3$).

However, since strength of an electric field applied to a dielectric layer by the same applied voltage increases if the thickness of the dielectric layer is reduced, in this case, DC-bias characteristics may deteriorate.

Also, the dielectric material is a ferroelectric material, whose dielectric constant undergoes significant changes as temperature changes, and therefore may drastically degrade properties of the multilayer capacitor at high temperature.

In this context, to minimize temperature-associated changes in the dielectric constant of a dielectric material of a multilayer capacitor, it is beneficial to employ elements having different valences and ion radii from each other within the Perovskite structure of the dielectric material, to thereby induce dielectric relaxation.

Such a dielectric relaxation phenomenon can minimize temperature-induced changes of the dielectric constant in the dielectric material, and can also minimize changes of the dielectric constant induced by an external electric field due to relaxor ferroelectric behaviors.

However, substitution with an element having a different valence than the element in the B site of the dielectric material may cause defects and consequently degrade reliability and insulation resistance.

To address the aforementioned issue, it is beneficial that the element being substituted into the dielectric material have a different ion radius but the same valence as the element in the B site of the dielectric material.

Also, according to the multilayer capacitor of the present example embodiment, an average thickness of the dielectric layers may be less than or equal to 0.4 µm, and an average thickness of the first and second internal electrodes may be less than or equal to 0.4 µm.

Typically, the smaller the average thickness of the dielectric layers of a multilayer capacitor, the more susceptible the multilayer capacitor becomes to changes in temperature and external electric fields.

However, according to the present example embodiment, by including zirconium (Zr) in a range from greater than 0.5 moles to 1.5 moles in the shell portions of the dielectric layers of the body, changes in the dielectric constant of the body due to changes in external environments can be minimized even when the average thickness of the dielectric layers is less than or equal to 0.4 µm or less.

During the manufacturing process of a multilayer capacitor, a small amount of zirconium (Zr) contamination may occur; however, in order to achieve the effect of minimizing changes in the dielectric constant as described above, it is beneficial that dielectric layers of the multilayer capacitor contain zirconium (Zr) in an amount greater than a contamination level. For example, the dielectric layers may contain zirconium (Zr) to a level that enables zirconium (Zr) to be detected in an amount greater than 0.5 moles from the entire body of a multilayer capacitor by inductively coupled plasma (ICP) analysis.

The dielectric composition used in the present example embodiment is barium titanate BT ($BaTiO_3$), which is a perovskite material containing $Ba^{2+}$ in the A-site and $Ti^{4+}$ in the B-site where the $Ba^{2+}$/A-site ions are larger than the $Ti^{4+}$/B-site ions.

Here, since $Zr^{4+}$ (0.72 nm) has the same valence as $Ti^{4+}$ (0.60 nm) but has an ion radius (0.72 nm) largely different from that of $Ti^{4+}$ (0.60 nm), zirconium is a suitable material for the aforementioned use.

The dielectric composition of the present example embodiment may minimize changes in dielectric constant associated with changes in temperature and external electric fields by having an element in the B-site of barium titanate BT ($BaTiO_3$) of the dielectric material, titanium (Ti), substituted with zirconium (Zr) that has the same valence as titanium (Ti) but different ion radius from that of titanium (Ti).

Accordingly, the multilayer capacitor may have a low temperature change coefficient (TCC), and excellent DC-bias characteristics and high reliability.

Hereinbelow, the present disclosure will be described in greater detail with reference to Embodiments and Comparative Examples. However, these example embodiments are provided to give the reader a comprehensive understanding of the present disclosure, and therefore it should be understood that the spirit and scope of the present disclosure are not limited by the example embodiments described herein.

The manufacturing process of the multilayer capacitor used in the experiment is as follows:

First, as the base material powder of the dielectric composition, BT having a 100 nm-grade of an average particle size or a lesser grade was used.

Comparative Example 1 is a case in which the dielectric layer of the body does not include zirconium (Zr); Comparative Example 2 is a case in which the dielectric layer of the body includes 0.2 moles of zirconium (Zr) with respect to 100 moles of the base material powder; Embodiment 1 is a case in which the dielectric layer of the body includes 0.6 moles of zirconium (Zr) with respect to 100 moles of the base material powder; and Embodiment 2 is a case in which the dielectric layer of the body includes 1.5 moles of the zirconium (Zr) with respect to 100 moles of the base material powder. Here, the zirconium (Zr) is included in oxide or carbonate form.

Further, in the present experiment, in Comparative Example 2 and Embodiments 1 and 2, the base material powder and zirconium, once prepared, were mixed with a dispersant by using zirconia balls as mixing and dispersing media, and by using ethanol and toluene as a solvent, and were subjected to ball milling for about 20 hours, and then mixed with a binder for implementing strength of a dielectric sheet, thereby producing slurry.

Next, the slurry thus produced was formed into a sheet having a thickness of 0.6 µm or more, using a small doctor blade type coater.

Next, the internal electrodes were printed with nickel (Ni) on the sheet thus formed, and then 15 sheets having a thickness of 3 µm were stacked on the upper and lower cover portions, respectively, to prepare a stacked body, and then, the stacked body was subjected to a compression process to produce a bar.

Then, by using a cutter, the bar was cut into a chip having a size of 0.6 mm length in an X direction×0.3 mm width in a Y direction.

Next, the chip was calcined in an atmosphere at 400° C. for removal of the binder, and then sintered at about 1,300° C. for about one hour in an atmosphere containing 2.0% or less of hydrogen ($H_2$).

Thereafter, a termination process and electrode sintering were performed with copper (Cu) paste to complete the multilayer capacitor.

Figure 4:
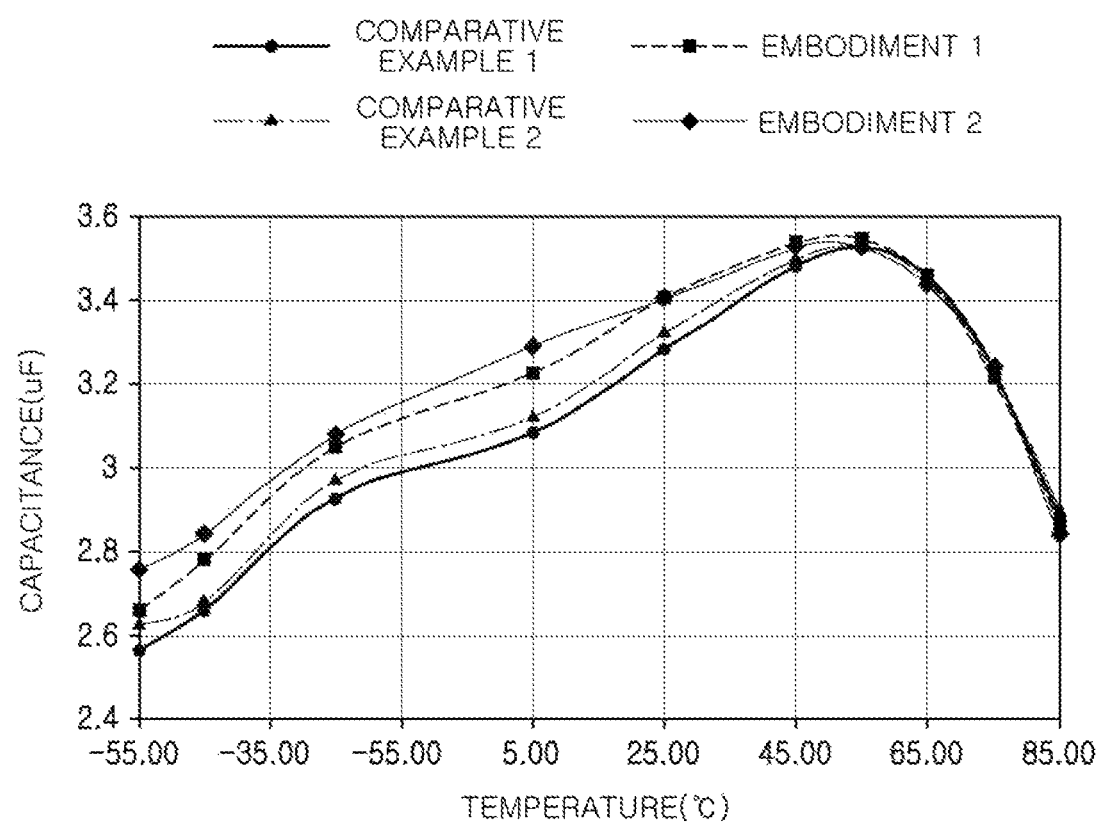
FIG. 4 is a graph illustrating changes in capacitance of a multilayer capacitor with respect to temperature, according to varying content of zirconium (Zr) contained in a body of the multilayer capacitor.
Figure 5:
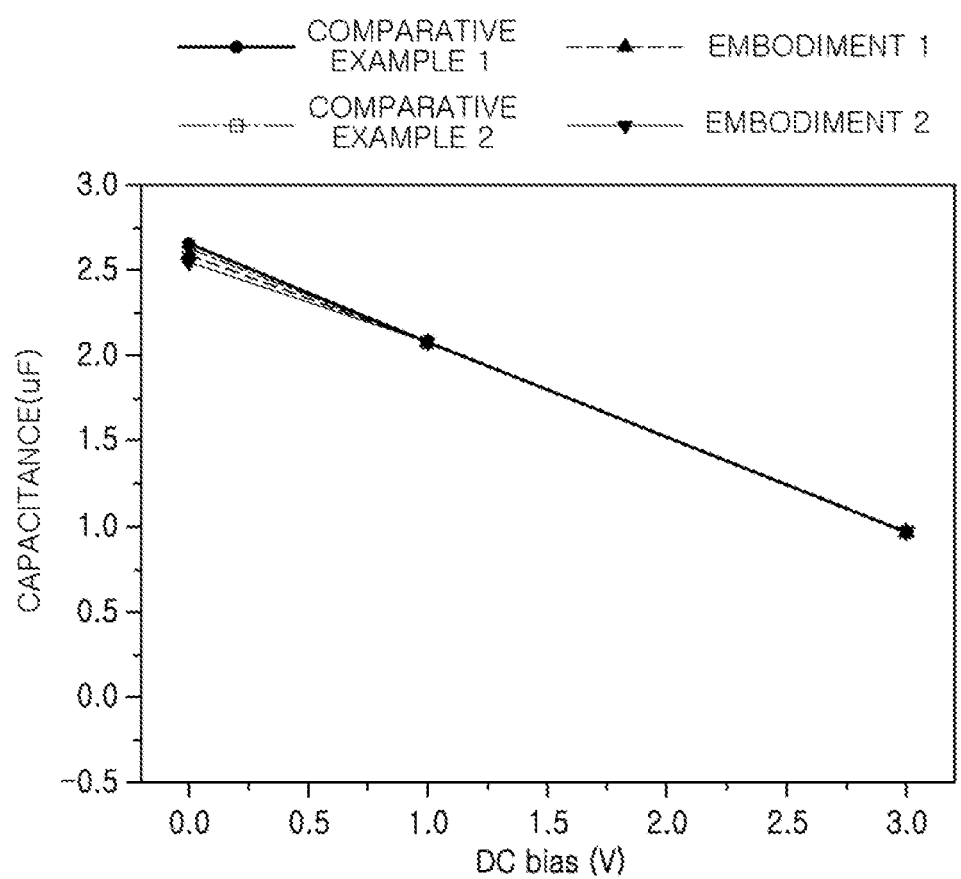
FIG. 5 is a graph illustrating changes in capacitance associated with DC bias, according to varying content of zirconium (Zr) contained in a body of the multilayer capacitor.

Furthermore, as shown in FIG. 4 and FIG. 5, properties of each sample of the multilayer capacitor were measured.

FIG. 4 is a graph illustrating changes in capacitance associated with temperature, depending on a content of zirconium (Zr) contained in the body of a multilayer capacitor.

Referring to FIG. 4, Embodiment 1 and Embodiment 2, each including more than 0.5 moles of zirconium (Zr) in dielectric layers, exhibited capacitance that was increased to a greater degree and retained at room temperature (25° C.) compared to Comparative Example 1 not including zirconium (Zr), thus showing that temperature-associated changes in capacitance of the multilayer capacitor were reduced.

Comparative Example 2 including 0.2 moles of zirconium (Zr), which is below a standard contamination level, exhibited a higher increase in capacitance compared to Comparative Example 1; however, this increase was not significantly large, and therefore, it was deemed that compared to Embodiment 1 and Embodiment 2, Comparative Example 2 did not exhibit an apparent increase in capacitance at room temperature or below. Accordingly, it was deemed that in Comparative Example 2, temperature-associated changes in capacitance were still significantly large.

In other words, in those cases where titanium (Ti) of the dielectric material is substituted with zirconium (Zr) having an ion radius different from that of titanium (Ti), and where the content of zirconium (Zr) is 0.5 moles or less with respect to 100 moles of the base material powder, no apparent dielectric relaxation behavior showed.

Accordingly, the present example embodiment, by limiting the content of zirconium (Zr) contained in the body to a range from greater than 0.5 moles to 1.5 moles (e.g., with respect to 100 moles of the base material powder), can induce such dielectric relaxation behaviors to reduce temperature-associated changes in dielectric constant.

Figure 6:
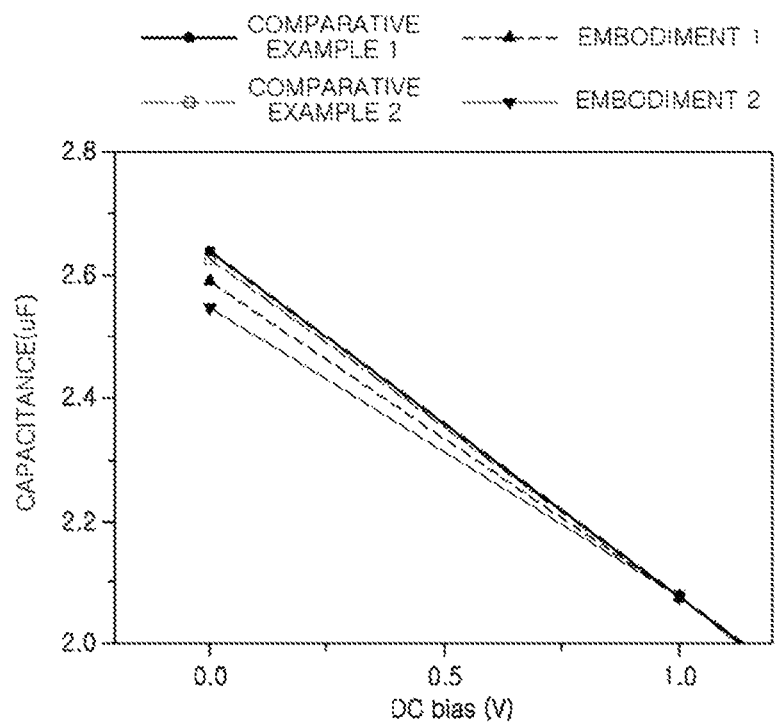
FIG. 6 is an expanded view of a part of the graph of FIG. 5, the part where differences in capacitance between Comparative Examples and Embodiments are significantly large.

FIG. 5 is a graph illustrating, for comparison purposes, changes in capacitance with DC bias in a multilayer capacitor with varying content of zirconium (Zr) contained in a body of the multilayer capacitor, and FIG. 6 is an expanded view of a part of the graph of FIG. 5, the part where differences in capacitance are significantly large between the Comparative Examples and the Embodiments.

In FIG. 5 and FIG. 6, Comparative Example 1 is a case in which zirconium (Zr) is not included in dielectric layers of the body, Comparative Example 2 is a case in which 0.2 moles of zirconium (Zr) is included in dielectric layers of the body with respect to 100 moles of the base material powder, Embodiment 1 is a case in which 0.6 moles of zirconium (Zr) is included in dielectric layers of the body with respect to 100 moles of the base material powder, and Embodiment 2 is a case in which 1.5 moles of zirconium (Zr) is included in dielectric layers of the body with respect to 100 moles of the base material powder.

Referring to FIG. 5 and FIG. 6, Embodiment 1 and Embodiment 2, where the dielectric layers contain more than 0.5 moles of zirconium, when dielectric constants are similar to each other and at room temperature, it could be confirmed that changes in their respective dielectric constants due to an applied DC voltage had decreased.

This is due to dielectric relaxation behaviors due to a difference in ion radii of titanium (Ti) and zirconium (Zr), and when the content of zirconium (Zr) within dielectric material is 0.5 or less (see Comparative Example 2), since relaxation behaviors are negligible, thus, changes in dielectric constant are significant due to an applied DC voltage.

Accordingly, by limiting the content of zirconium (Zr) contained in a body to a range from greater than 0.5 moles to 1.5 mole or less, changes in dielectric constant due to an applied DC voltage can be minimized.

According to the example embodiments described herein, even when dielectric layers in a multilayer capacitor are relatively thin, the dielectric composition can minimize degradation of DC-bias characteristics, temperature-associated changes in dielectric constant, and a loss of capacitance at high temperature.

The scope of the present disclosure is defined, not by the detailed description of the present disclosure or accompanying drawings, but by the appended claims.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including dielectric layers each having an average thickness of 0.4 μm or less, and internal electrodes each having an average thickness of 0.4 μm or less; and
an external electrode disposed on the body to be connected to the internal electrodes,
wherein the dielectric layers contain dielectric grains including a base material including barium titanate ($BaTiO_3$), and shell portions including an additive employed therein and grain boundaries present among the dielectric grains, wherein the shell portions of the dielectric layers include zirconium (Zr) within a range from greater than 0.5 moles to 1.5 moles or less, with respect to 100 moles of the base material.

2. The multilayer capacitor of claim 1, wherein the shell portions of the dielectric layers further include gadolinium (Gd) within a range from 0.3 moles to 2.0 moles, with respect to 100 moles of the base material.

3. The multilayer capacitor of claim 1, wherein the dielectric grains of the dielectric layers further include an aluminum (Al) oxide.

4. The multilayer capacitor of claim 1, wherein the dielectric grains of the dielectric layers further include a magnesium (Mg) oxide or carbonate.

5. The multilayer capacitor of claim 1, wherein the dielectric grains of the dielectric layers further include an aluminum (Al) oxide, and a magnesium (Mg) oxide, or carbonate.

6. The multilayer capacitor of claim 1, wherein a length of the multilayer capacitor is less than or equal to 1.0 mm, and a width of the multilayer capacitor is less than or equal to 0.5 mm.

7. A multilayer capacitor comprising:
a body comprising a plurality of first internal electrodes and a plurality of second internal electrodes that are alternately stacked with dielectric layers therebetween; and
first and second external electrodes connected to the plurality of first internal electrodes and to the plurality of second internal electrodes, respectively,
wherein an average thickness of one of the dielectric layers is 0.4 μm or less, and an average thickness of one of the plurality of first and one of the plurality of second internal electrodes is 0.4 μm or less,
wherein the dielectric layers include barium titanate ($BaTiO_3$) as a perovskite material in which a plurality of $Ti^{4+}$ ion sites are occupied by ions having a same valence as the $Ti^{4+}$ ions and a different radius therefrom within a range from greater than 0.5 moles to 1.5 moles or less, with respect to 100 moles of the perovskite material.

8. The multilayer capacitor of claim 7, wherein the $Ti^{4+}$ ion sites are occupied by $Zr^{4+}$ ions.

9. The multilayer capacitor of claim 7, wherein the ions having the same valence as the $Ti^{4+}$ ions and occupying sites of the $Ti^{4+}$ ions of the perovskite material have a larger radius than the $Ti^{4+}$ ions of the perovskite material.

10. The multilayer capacitor of claim 7, wherein the dielectric layers further include gadolinium (Gd) within a range from 0.3 moles to 2.0 moles, with respect to 100 moles of a material of the dielectric layers.

11. The multilayer capacitor of claim 7, wherein the dielectric layers further include an aluminum (Al) oxide.

12. The multilayer capacitor of claim 7, wherein the dielectric layers further include a magnesium (Mg) oxide or carbonate.

13. The multilayer capacitor of claim 7, wherein the dielectric layers further include an aluminum (Al) oxide, and a magnesium (Mg) oxide or carbonate.

* * * * *